US011421775B2

(12) United States Patent
Reid et al.

(10) Patent No.: US 11,421,775 B2
(45) Date of Patent: Aug. 23, 2022

(54) PRESSURIZED AERATION PREVENTION RESERVOIR

(71) Applicant: Deere & Company, Moline, IL (US)

(72) Inventors: David G. Reid, Cedar Falls, IA (US); Fernando Sandoval, Waterloo, IA (US)

(73) Assignee: Deere & Company, Moline, IL (US)

( * ) Notice: Subject to any disclaimer, the term of this patent is extended or adjusted under 35 U.S.C. 154(b) by 223 days.

(21) Appl. No.: 16/669,624

(22) Filed: Oct. 31, 2019

(65) Prior Publication Data

US 2021/0131551 A1  May 6, 2021

(51) Int. Cl.
*F16H 57/04* (2010.01)
*A01B 33/08* (2006.01)
*F01M 11/00* (2006.01)
*F16H 57/02* (2012.01)

(52) U.S. Cl.
CPC ..... *F16H 57/0435* (2013.01); *F16H 57/0447* (2013.01); *F16H 57/0453* (2013.01); *A01B 33/082* (2013.01); *F01M 11/0004* (2013.01); *F01M 2011/0058* (2013.01); *F16H 2057/02056* (2013.01)

(58) Field of Classification Search
CPC ............ F16H 57/0424; F16H 57/0421; F16H 57/0435; F16H 57/0434; F16H 57/045; F16H 57/0452; F16H 57/0453; F16H 57/0461; F16H 57/0458; F16H 57/0457; F16H 2057/02056; F16H 57/0446; F01M 11/0004; F01M 2011/0058; F01M 2011/0037; A01B 33/082
See application file for complete search history.

(56) References Cited

U.S. PATENT DOCUMENTS

| 2,743,627 | A | * | 5/1956 | Christeuson | ........ F15B 21/044 |
| | | | | | 74/606 R |
| 3,509,861 | A | * | 5/1970 | Deutschmann | .......... F01M 1/02 |
| | | | | | 123/196 R |
| 3,529,698 | A | * | 9/1970 | Nelson | ................ F16H 57/0447 |
| | | | | | 184/6.12 |
| 3,670,499 | A | | 6/1972 | Tucholski | |
| 3,800,913 | A | * | 4/1974 | Schmitt | .................... F01M 1/12 |
| | | | | | 184/6.13 |

(Continued)

FOREIGN PATENT DOCUMENTS

| DE | 3208100 A1 | 9/1983 |
| EP | 1602861 B1 | 5/2012 |

OTHER PUBLICATIONS

German Search Report issued in counterpart application No. 102020211894.9 dated Apr. 15, 2021 (08 pages).

(Continued)

*Primary Examiner* — Daniel D Yabut
(74) *Attorney, Agent, or Firm* — Tucker Ellis LLP; Heather M. Barnes; Michael G. Craig

(57) ABSTRACT

An agricultural vehicle transmission may comprise a housing comprising a bulkhead where the bulkhead may divide the housing into a sump and a reservoir. The bulkhead may comprise an opening configured to fluidly couple the sump and the reservoir. A plurality of transmission gears may be disposed in the reservoir of the housing. The opening in the bulkhead may balance the vehicle transmission system to remove excess oil in the sump and away from the plurality of transmission gears.

13 Claims, 5 Drawing Sheets

(56) References Cited

U.S. PATENT DOCUMENTS

| | | | | |
|---|---|---|---|---|
| 4,736,819 | A * | 4/1988 | Muller | F16H 57/0447 |
| | | | | 123/196 AB |
| 5,505,112 | A * | 4/1996 | Gee | F16H 57/0447 |
| | | | | 180/339 |
| 6,299,561 | B1 * | 10/2001 | Kramer | F16H 57/0447 |
| | | | | 184/13.1 |
| 2007/0169583 | A1 * | 7/2007 | Reis | F16H 57/0447 |
| | | | | 74/606 R |
| 2016/0230817 | A1 * | 8/2016 | Kleinhardt | F16H 57/0457 |
| 2016/0341301 | A1 * | 11/2016 | Slesinski | F16H 57/0457 |
| 2018/0045295 | A1 * | 2/2018 | Kiyokami | B60K 6/445 |
| 2018/0274658 | A1 * | 9/2018 | Iizuka | F16H 57/0443 |

OTHER PUBLICATIONS

"7R Tractors Diagnostic Technical Manual," John Deere Waterloo Works, Mar. 24, 2020, information publicly available before Oct. 2019, 9 pages.

* cited by examiner

PRESSURIZED AERATION PREVENTION RESERVOIR

BACKGROUND

Transmissions for vehicles, including without limitation, agricultural vehicles, require lubrication of transmission gears, bearings and clutches that are part of the drive train. Oil can drip from shafts and the transmissions gears pooling in the bottom of the transmission housing. In some situations, the lower transmission gears of the drive train may be at least partially submerged in the excess oil. Excess oil can lead to reduced efficiencies, especially in colder temperatures. Additionally, excess oil may result in oil aeration, which can lead to cavitation in the transmission and pressure losses. Oil life and cooling performance may also be reduced due to excess oil. To remove the excess oil and yet keep it available for the rest of the vehicle system, larger pumps have been utilized, but these larger pumps are bigger than what is otherwise necessary for the system.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation a vehicle transmission may comprise a housing comprising a bulkhead where the bulkhead may divide the housing into a sump and a reservoir. The bulkhead may comprise an opening configured to fluidly couple the sump and the reservoir. A plurality of transmission gears may be disposed in the sump of the housing.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
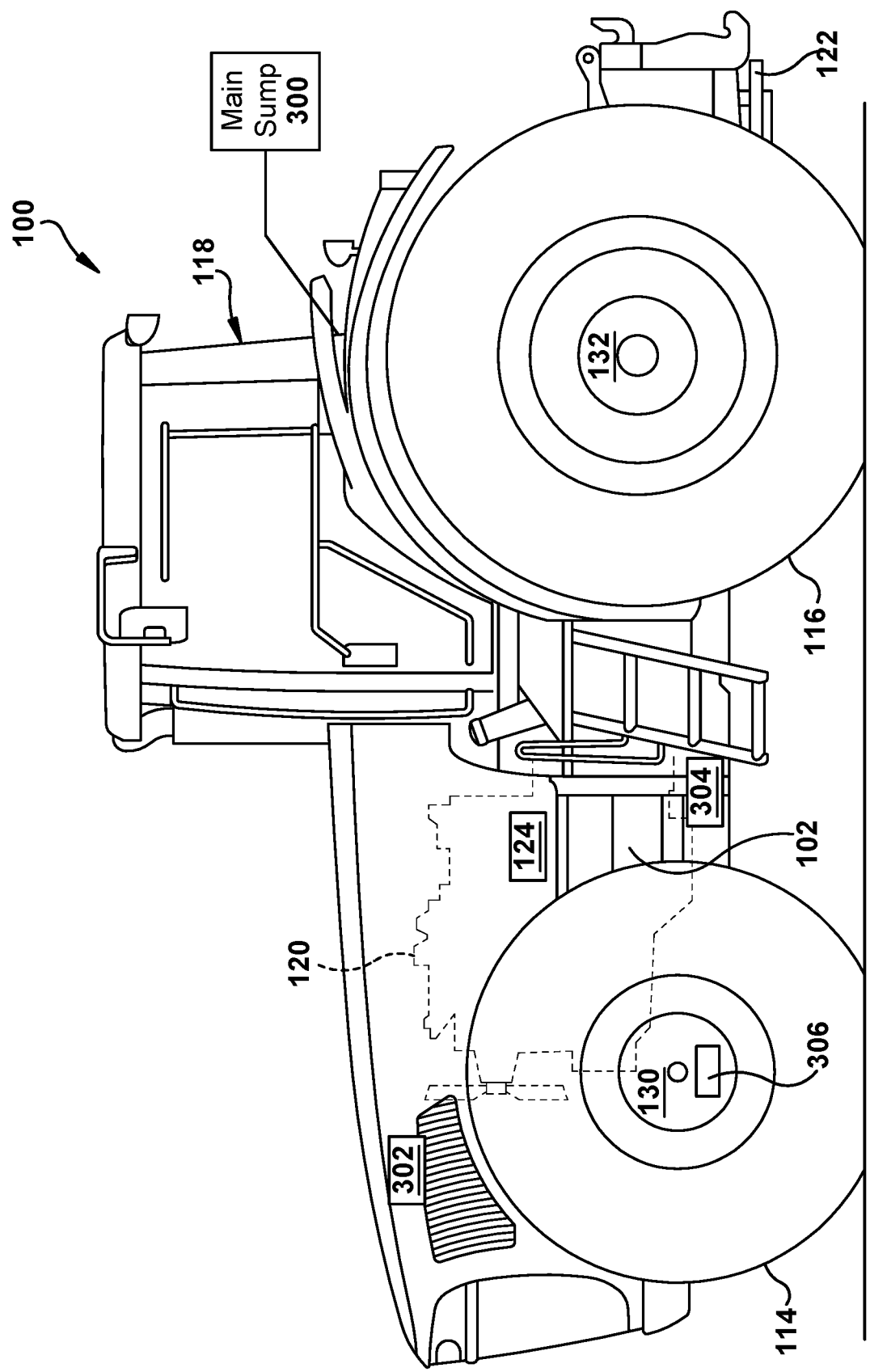
FIG. 1 is an example of a vehicle comprising one implementation of a vehicle transmission.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, a vehicle 100, including without limitation an agricultural vehicle such as a tractor, is shown. The vehicle 100 may include a frame 102, front tires 114, rear tires 116, a vehicle cab 118, an engine 120, and a pick-up hitch 122. The vehicle 100 may be any vehicle such as an automobile, bus, van, truck, or sports utility vehicle. In other implementations, the vehicle may be any agricultural vehicle, including without limitation a tractor, all-terrain vehicle, utility terrain vehicle, backhoes, and front end loaders, for example.

The engine 120 further comprises a transmission 124 that may have an input shaft 126 configured to be coupled to and driven by the engine 120 or other source of rotational power. The transmission 124 may also have an output shaft 128 operably coupled with the front wheels 130 and/or rear wheels 132.

With reference to FIGS. 2-5, the transmission 124 may have a housing 134. The housing 134 may have a rear portion 136 and a front portion 138. The rear portion 136 and front portion 138 may joined together in any means chosen with sound engineering judgment, including without limitation, a wetted gasket (not shown) and bolts. The front portion 138 may comprise a mounting pad 140 for interfacing with a front manifold and/or valves. A plurality of shafts 142 with bearings 144 may be accessible through the mounting pad 140. Structural members 146 may be operably connected to the housing 134. The housing may further comprise a bottom wall 156 and a top wall 158 oppositely disposed of the bottom wall 156. In one example implementation a first side wall 160 and a second side wall 162 that may interconnect the top wall 158 and the bottom wall 156.

The housing 134 may comprise a bulkhead 148 that may define a sump 150 and a reservoir 152 inside the housing 134. A plurality of gears 154 may be disposed in the sump 150. Each of the plurality of gears 154 may be operably coupled with a respective shaft 142. The plurality of gears 154 may be arranged in any configuration chosen with sound engineering judgment. In one example configuration, one or more gears may be disposed at a lower most portion relative to the other gears. Such one or more gears may be disposed adjacent to the bottom wall 156 of the housing 134. Each of the gears 154 may have a plurality of gear teeth 155 spaced about the perimeter of the gear.

Figure 2:
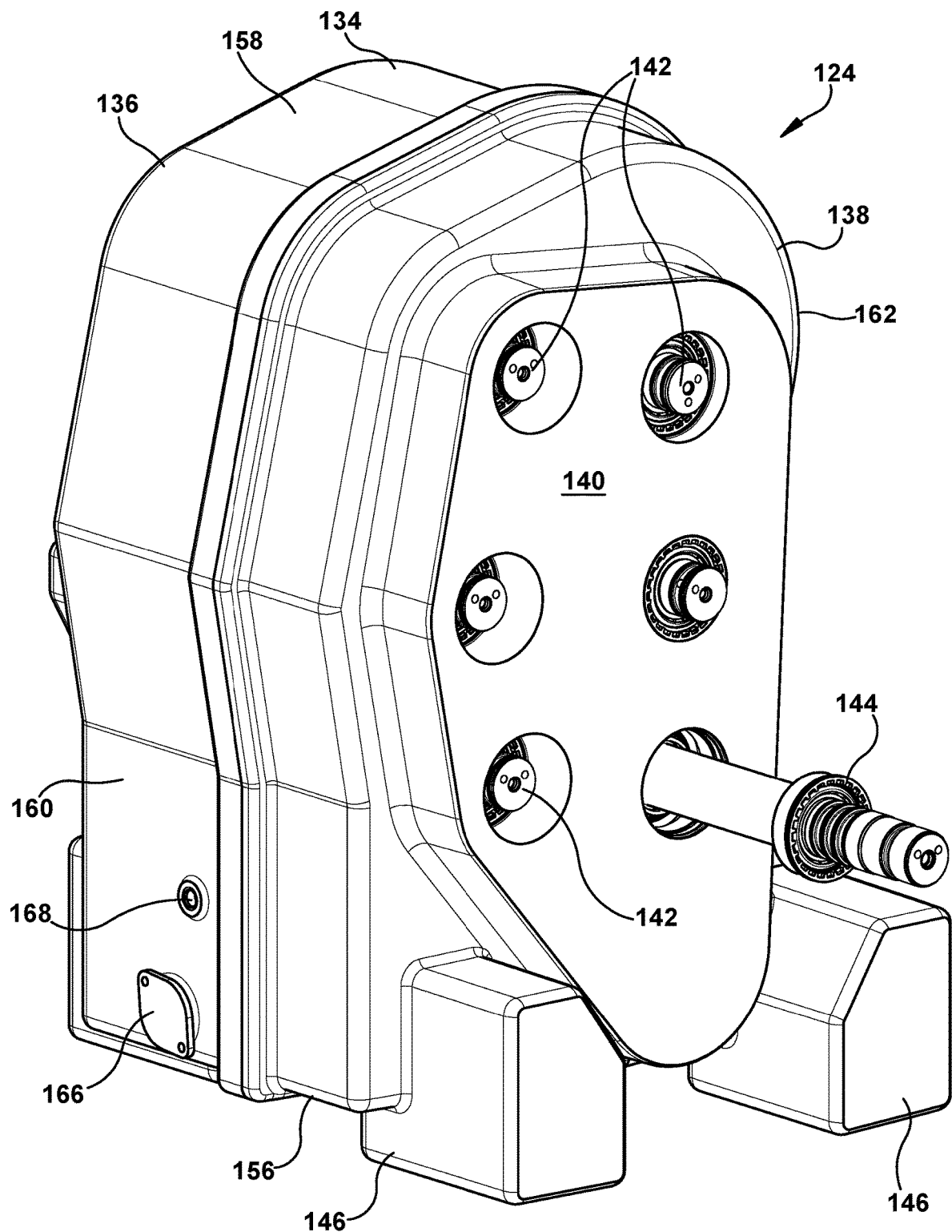
FIG. 2 is a perspective view of one implementation.
Figure 3:
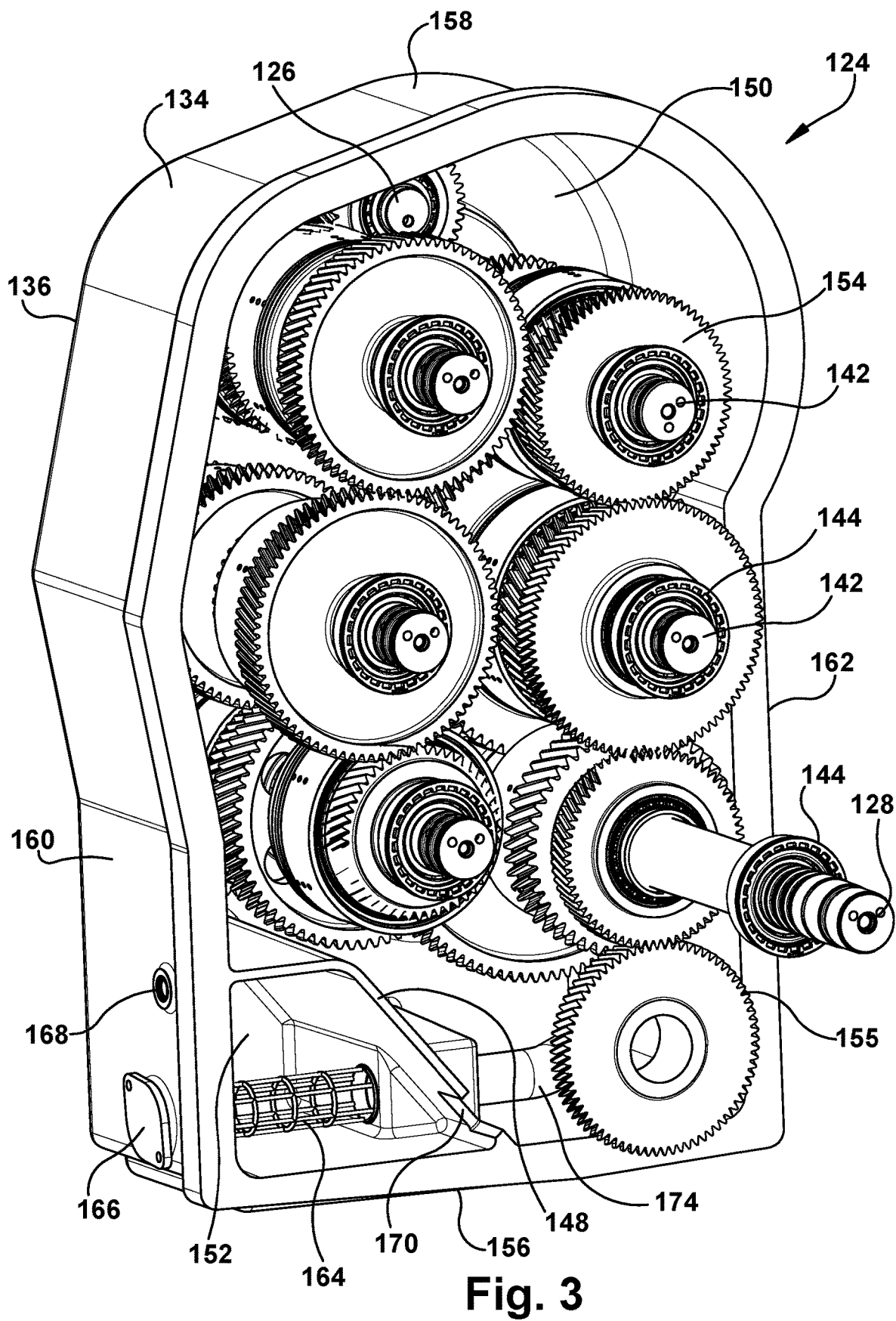
FIG. 3 is another perspective view of FIG. 2.

In one example implementation, the reservoir 152 may be adjacent the sump 150 and may be defined by the bulkhead 148, the bottom wall 156 and the first side wall 160. A filter 164 may disposed in the reservoir 152 and have a filter cover 166 operably connected to the filter 164. The filter cover 166 may be connected to the filter 164 through the first side wall 160 as shown in FIGS. 2 and 3. The first side wall 160 may also have a port 168 defined therethrough to fluidly couple the reservoir 152 with another portion of the vehicle. In one example implementation, the port 168 may be fluidly coupled with the main sump 300, which may be disposed near the rear axle of the vehicle 100.

The bulkhead 148 may divide the inside of the housing 134 into the sump 150 and the reservoir 152. The shape or profile of the bulkhead 148 may be any shape chosen with sound engineering judgment. As shown in FIG. 3, the bulkhead 148 may upwardly slope from the bottom wall 156 of the housing 134 towards the first side wall 160. The bulkhead 148 may have a substantially horizontal portion that attaches to the first side wall 160. The bulkhead 148 may comprise an opening 170 configured to fluidly couple the sump 150 and the reservoir 152. The opening 170 may be sized and positioned to transfer a fluid from the sump 150 to the reservoir 152. The opening 170 may be positioned within the upwardly sloping portion of the bulkhead 148. In another nonlimiting implementation, the opening 170 may be positioned adjacent the bottom wall 156 of the housing.

Figure 4:
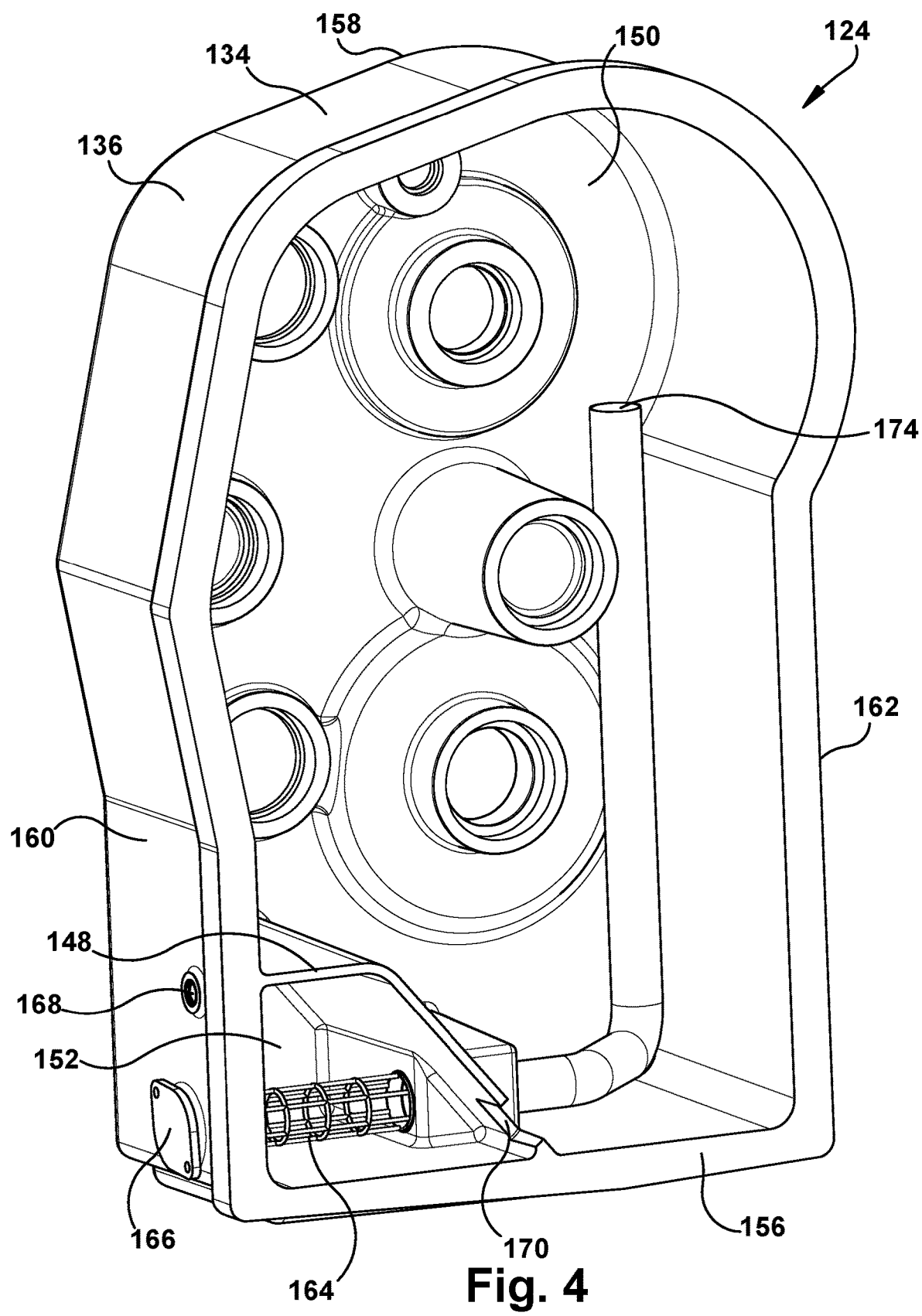
FIG. 4 is another perspective view of FIG. 2.

With continuing reference to FIGS. 3 and 4, in another nonlimiting implementation, the opening 170 is sized and positioned so that air pressure in the sump 150 acts on the fluid and pushes it through the opening 170 into the reservoir. In example implementations, the pressure in the sump 148 is low, such as less than 5 psi, less than 2 psi, and in some implementations no more than 1.5 psi. The reservoir 152 also has an air pressure. In one example implementation, the air pressure in the reservoir is less than the air pressure in the sump 150.

In one implementation, the sump 148 may have a fluid level. The fluid level may be a desired fluid level for the transmission application. In one implementation, the desired fluid level may be of a depth where the lowest positioned gear of the plurality of transmission gears 154 contacts the fluid just enough to splash or transfer fluid onto itself and then the remaining transmission gears 154 to lubricate the transmission gears 154. In one implementation, a lower portion of the lowest gear may contact the fluid in the sump 150. In another implementation, the gear teeth 155 may contact the fluid in the sump 150 to transfer fluid to the other transmission gears 154. In another nonlimiting implementation, the desired fluid level may be no higher than a top edge 172 of the opening 170.

The reservoir 152 also has a fluid level. During operation, the fluid level in the reservoir 152 is higher than the fluid level in the sump 150. When the fluid level in the reservoir 152 reached the port 168, the fluid exits the reservoir 142 and may return to another area of the vehicle 100, such as the main sump 300.

Figure 5:
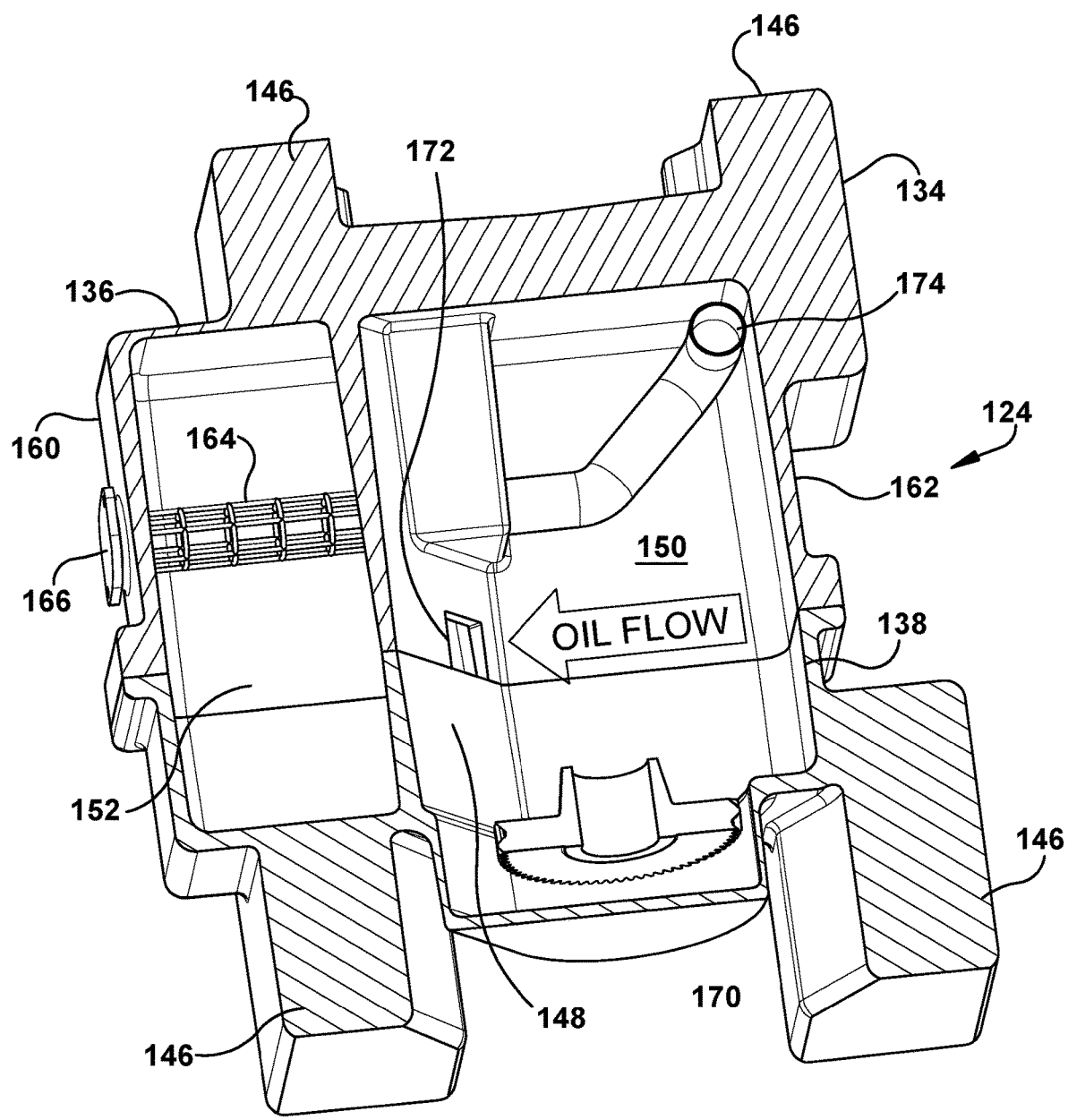
FIG. 5 is a top perspective cut away view of FIG. 2.

With reference to FIGS. 3, 4, and 5, a suction line 174 may disposed in the transmission housing 134. The suction line 174 may fluidly couple the reservoir 152 to another vehicle component outside the transmission housing 134. The suction line 174 may fluidly couple the reservoir 152, for example, to a cooling system 302, a filtration system 304, and a lubrication mechanism 306 to the axles.

Any fluid may be chosen with sound engineering judgment for the transmission. For example, the fluid may be oil or other lubricating fluid for the transmission or other systems for the vehicle 10.

During operation of a dynamic transmission system, the fluid may be balanced between the sump 150 and the reservoir 152 as follows. The plurality of transmission gears 154 rotate and fluid may collect or pool at or near the bottom wall 156 of the housing 134. As the fluid level rises in the sump 150, air in the sump 150 acts on the fluid and pushes it through the opening 170 of the bulkhead 148 and into the reservoir 152. At least a lower portion of one gear is able to contact the low level of fluid in the sump 150 to lubricate the plurality of gears 154. Fluid in the reservoir 152 continues to rise. Some of the fluid may pass through the filter 164 and through the suction line 174 to other areas of the vehicle 100. The rising fluid in the reservoir may also pass through the port 168 and may be returned to the main sump 300 of the vehicle. As such, through the operation, a desired level of fluid is maintained in the sump 150 to lubricate the plurality of gears 154 or other components and remove excess oil from the sump 152 and transfer it to the reservoir 152. This may prevent oil aeration, increase oil life and enhance cooling performance. It will also enable use of a smaller pump for the fluid. In one implementation, the pump may be undersized by about 10% for the system. In other example implementations, when the vehicle 100 encounters an incline or other non-level operation, the desired fluid level is maintained in the sump 150 and mitigates extra fluid sloshing in the sump 150.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A vehicle transmission, comprising:
a housing comprising a bulkhead, the bulkhead dividing the housing into a sump and a reservoir, the bulkhead comprising an opening configured to fluidly couple the sump and the reservoir, the reservoir defined by a bottom wall, a side wall, and the bulkhead, the bulkhead connected to the side wall and the bottom wall, the bulkhead upwardly sloping from the bottom wall toward the side wall;
a plurality of transmission gears disposed in the sump of the housing;
a fluid disposed at a bottom of the housing at a fluid level no higher than a top of the bulkhead opening, a lower portion of one of the plurality of transmission gears configured to contact the fluid, the reservoir configured to receive overflow fluid from the sump through the opening;
a port at least partially disposed in the reservoir and fluidly coupling the reservoir to a main sump of the vehicle;
a filter disposed in the reservoir, and,
a suction line at least partially disposed in the sump and fluidly coupling the sump to one or more of a cooling system, a filtration system, and a lubrication mechanism for axles of the vehicle;
wherein the fluid is oil, the sump comprising an oil level, the reservoir comprising an oil level, the reservoir oil level is greater than the sump oil level;
wherein the housing comprising a pressure differential defined by a sump air pressure and a reservoir air pressure, the sump air pressure being greater than the reservoir air pressure, the pressure differential configured to transfer fluid from the sump through the bulkhead opening and to the reservoir, the sump air pressure being less than 5 psi;
wherein the vehicle is an agricultural vehicle.

2. The vehicle transmission of claim 1, the sump air pressure being less than 2 psi.

3. The vehicle transmission of claim 1, the lower portion of one of the plurality of transmission gears further comprises gear teeth, the gear teeth configured to contact the fluid.

4. The vehicle transmission of claim 1, wherein the agricultural vehicle is one or more of a tractor, all-terrain vehicle, utility terrain vehicle, a backhoe, and a front end loader.

5. The vehicle transmission of claim 1, further comprising:
an input shaft configured to be coupled to and driven by an engine; and
an output shaft operably coupled with wheels of the agricultural vehicle.

6. The vehicle transmission of claim 1, wherein one or more transmission gears disposed at a lower most portion relative to the other gears.

7. The vehicle transmission of claim 6, wherein the one or more transmission gears disposed adjacent to the bottom wall of the housing.

8. The vehicle transmission of claim 1, wherein the opening being positioned adjacent the bottom wall of the housing.

9. The vehicle transmission of claim 1, wherein the sump, the reservoir, and the opening are configured to maintain a fluid level in the sump during a non-level operation of the agricultural vehicle.

10. A vehicle transmission, comprising:
a bulkhead dividing a housing into a sump and a reservoir, the bulkhead including an opening to transfer a lubricating fluid from the sump to the reservoir, the bulkhead connected to a side wall and a bottom wall of the reservoir, the bulkhead upwardly sloping from the bottom wall to the side wall, the lubricating fluid disposed in the housing at a fluid level below a top of the opening, and the reservoir including a port fluid coupling the reservoir to a main sump;
a plurality of transmission gears disposed in the sump, one of the plurality of transmission gears in contact with the lubricating fluid;
a filter disposed in the reservoir; and
a suction line at least partially disposed in the sump and fluidly coupling the sump to a vehicle component outside of the housing;
wherein the housing includes a pressure differential defined by a sump air pressure being greater than a reservoir air pressure, the pressure differential configured to transfer fluid from the sump to the reservoir via the opening, the sump air pressure being less than 5 psi.

11. The vehicle transmission of claim 10, wherein the opening is positioned adjacent the bottom wall of the reservoir.

12. The vehicle transmission of claim 10, wherein the sump air pressure being less than 2 psi.

13. The vehicle transmission of claim 10, wherein the vehicle component is one or more of a cooling system, a filtration system, and an axle lubrication mechanism.

* * * * *